(12) United States Patent
Harrar et al.

(10) Patent No.: US 11,082,130 B2
(45) Date of Patent: Aug. 3, 2021

(54) SYSTEM FOR MANAGING A FIBRE-OPTIC ETHERNET NETWORK OF A VEHICLE

(71) Applicant: PSA AUTOMOBILES SA, Poissy (FR)

(72) Inventors: Ahmed Harrar, Argenteuil (FR); Doarte Goncalves, Rueil Malmaison (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/643,806

(22) PCT Filed: Aug. 31, 2018

(86) PCT No.: PCT/FR2018/052136
§ 371 (c)(1),
(2) Date: Mar. 2, 2020

(87) PCT Pub. No.: WO2019/053352
PCT Pub. Date: Mar. 21, 2019

(65) Prior Publication Data
US 2020/0244361 A1 Jul. 30, 2020

(30) Foreign Application Priority Data
Sep. 14, 2017 (FR) ...................... 1758544

(51) Int. Cl.
*H04B 10/27* (2013.01)
*H04B 10/25* (2013.01)
(Continued)

(52) U.S. Cl.
CPC ......... *H04B 10/2589* (2020.05); *H04B 10/27* (2013.01); *H04L 12/12* (2013.01); *H04L 67/12* (2013.01)

(58) Field of Classification Search
CPC ..... H04B 10/2503; H04B 10/27; H04L 12/12; H04L 67/12
See application file for complete search history.

(56) References Cited

U.S. PATENT DOCUMENTS 9,021,075 B2 * 4/2015 Rocher ............ H04L 12/40039
709/223
2010/0148940 A1 * 6/2010 Gelvin ................ H04L 67/12
340/286.02
(Continued)

FOREIGN PATENT DOCUMENTS

FR 3031856 A1 7/2016
WO 2010070218 A1 6/2010

OTHER PUBLICATIONS

International Search Report for PCT/FR2018/052136 dated Nov. 6, 2018.
Written Opinion for PCT/FR2018/052136 dated Nov. 6, 2018.

*Primary Examiner* — Dzung D Tran
(74) *Attorney, Agent, or Firm* — Sandberg Phoenix & von Gontard, P.C.

(57) ABSTRACT

The invention relates to a system for managing (1) a communication network (W) of a vehicle, said management system (1) comprising a plurality of computers (10, 20) connected to said network (W), and a two-way wired link (L) connecting said plurality of computers (10, 20), said network (W) having a standby state and an awake state, said plurality of computers (10, 20) comprising a master computer (10) and at least one slave computer (20), said master computer (10) and said at least one slave computer (20) being configured to emit and receive a message relative to a requested state of the network (W) via said two-way wired link (L), the state of at least one of the plurality of computers (10, 20) being controlled from said message relative to the requested state, so as to monitor the state of the network (Continued)

(W), said communication network (W) being a fiber-optic Ethernet network.

9 Claims, 3 Drawing Sheets

(51) Int. Cl.
*H04L 12/12* (2006.01)
*H04L 29/08* (2006.01)

(56) References Cited

U.S. PATENT DOCUMENTS

| | | | | |
|---|---|---|---|---|
| 2011/0238083 | A1* | 9/2011 | Moll | A61B 34/76 606/130 |
| 2015/0205339 | A1* | 7/2015 | Park | G06F 1/3287 713/323 |
| 2015/0370272 | A1* | 12/2015 | Reddy | H04W 4/80 700/278 |
| 2019/0385057 | A1* | 12/2019 | Litichever | G06N 3/08 |

* cited by examiner

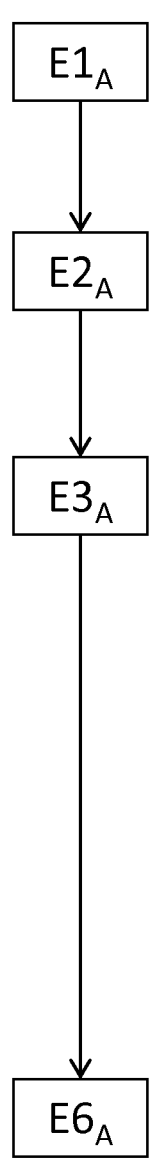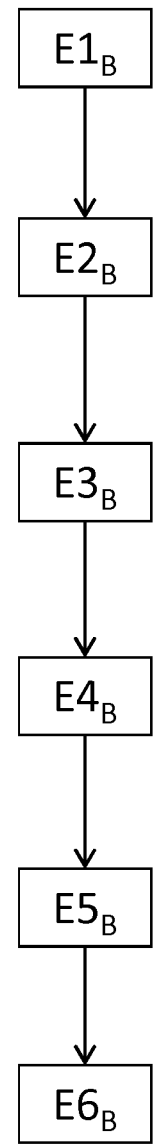
Figure 5
Figure 6

SYSTEM FOR MANAGING A FIBRE-OPTIC ETHERNET NETWORK OF A VEHICLE

CROSS-REFERENCE TO RELATED APPLICATIONS

This application is the US National Stage under 35 USC § 371 of International Application No. PCT/FR2018/052136, filed 31 Aug. 2018 which claims priority to French Application No. 178544 filed 14 Sep. 2017, both of which are incorporated herein by reference.

BACKGROUND

The invention relates, in a general manner, to the field of onboard communications networks in a vehicle. The invention relates in particular to a system for managing a fiber-optic Ethernet network of a motor vehicle.

In a general manner, a motor vehicle comprises a plurality of onboard computers that make it possible to command the various functions of the vehicle, such as the engine ignition controls, the safety controls, such as the airbags or signal lights, for example, or even comfort controls accessible from the passenger compartment of the vehicle, such as heating or closing and opening windows, for example.

In a known manner, each onboard computer, dedicated to a set of functions (engine functions, safety functions, or comfort functions, in the example cited above), is connected to a computer designated as a "master computer" which is configured to control each of the other onboard computers that are designated as "slave computers."

In order to achieve this, the master computer communicates with all the slave computers via a local communications network, referred to as an Ethernet network. A communications network of this kind thus connects the master computer to a plurality of slave computers, all the computers of the vehicle being interconnected so as to allow for coordination of the actions of each.

In a known manner, a computer network of this kind is controlled so as to be put into a "standby" state or an "awake" state, depending on the needs of the vehicle or of the driver, so as to allow for energy saving in the vehicle, for example. Such transitions into a standby or awake state must be synchronized among all the computers of the network, in order to limit the data losses.

For this purpose, a system for managing an Ethernet network of a motor vehicle is known, which system makes it possible to wake the network and to put the network into standby mode. A system of this kind comprises a main computer that is connected to the Ethernet network via a pair of twisted cables of the 100 Base-T1 type, typically referred to as Ethernet cables. The main computer is configured to manage the wakeup and transition into standby of the auxiliary computers, via a wire connection that connects all the computers. However, nowadays Ethernet cables are increasingly replaced by fiber-optic cables of the 100 Base-TX type which are less susceptible to disruption. In a known manner, the fiber-optic communication is in the form of a light signal designed to move along a fiber of this kind. In this case, reference is generally made to a fiber-optic Ethernet network.

For fiber-optic Ethernet networks of this kind that are integrated into a vehicle, the prior art does not propose a system that allows for management of the network, such as, for example, putting into standby or waking up all the computers of the network.

Indeed, FR 3031856 discloses an Ethernet switch for a fiber-optic network, comprising a transmitter that is configured for transmitting a light signal via a fiber-optic cable, and a receiver that is configured for receiving a light signal of this kind and for converting the signal into an electric signal. The switch described in FR 3031856 further comprises a supply circuit and a wakeup circuit that is configured for generating an electrical wakeup signal upon receiving the light signal. A wakeup circuit of this kind is connected to the supply circuit, making it possible to start up the switch-on of a transmitter of this kind.

However, a switch of this kind cannot be used in a fiber-optic Ethernet network of a motor vehicle, which is a significant disadvantage.

SUMMARY

The invention therefore aims to overcome these disadvantages at least in part by proposing a simple and effective system that allows for management of the state of a vehicle communications network of the fiber-optic Ethernet type.

More specifically, in order to achieve this result, the present invention relates to a system for managing a multiplex communications network of a vehicle, the management system comprising a plurality of computers that are connected to the communications network, and a bidirectional wired link that interconnects the plurality of computers, the communications network and the plurality of computers having a standby state and an awake state, the plurality of computers comprising a master computer and at least one slave computer, the master computer and the at least one slave computer being configured for emitting and receiving a message relating to a requested state of the communications network via the bidirectional wired link, the state of at least one of the plurality of computers being controlled on the basis of the message relating to the requested state, so as to control the state of the communications network, the communications network being of the fiber-optic Ethernet type.

A management system of this kind advantageously makes it possible to control a fiber-optic Ethernet communications network being put into standby mode and being woken, thus allowing for energy saving in the systems of the vehicle. Owing to a management system of this kind, the state of a fiber-optic Ethernet communications network of this kind can be controlled on the basis of messages received by one of the computers via the bidirectional wired link.

Advantageously, any computer of the communications network can command the wakeup, by activating the wired link which is bidirectional.

Advantageously, the message relating to the state of the communications network corresponds to a change in state of a signal emitted by the master computer and/or by the at least one slave computer, via the bidirectional wired link.

Preferably, since the emitted signal has a high state and a low state, the high state or the low state of the signal corresponds to the awake state of the communications network, and the other of the high state or the low state of the signal corresponds to the standby state of the communications network.

Advantageously, the master computer and the at least one slave computer are configured to emit and receive, respectively, via the communications network, a confirmation message relating to the requested state, making it possible for the network not to be woken when the wakeup request has not been validated by the master computer.

Advantageously, since the system comprises a first slave computer and at least one second slave computer, and since the at least one second slave computer is connected to the master computer and to the first slave computer by means of a bidirectional wired link, at least one of the master computer or the first slave computer comprises a switch that is designed to connect the at least one second slave computer to the communications network, making it possible to control all the computers of the network.

A motor vehicle is also disclosed which comprises a fiber-optic Ethernet communications network and a system for managing a state of the communications network as described above.

Lastly, a method is disclosed for managing multiplex communications network of a vehicle, the vehicle comprising a system for managing the communications network which has a standby state and an awake state, the management system comprising a master computer and at least one first slave computer, the communications network being of the fiber-optic Ethernet type, the method comprising a phase of waking up the communications network, comprising:

a step of activating the bidirectional wired link, a step of the master computer or the first slave computer sending a wakeup message for the communications network via the bidirectional wired link, a step of the other of the master computer or the first slave computer receiving the wakeup message, and a step of waking up the master computer and the first slave computer, resulting in the wakeup of the communications network.

Advantageously, since the step of sending a wakeup message for the communications network is performed by the first slave computer, the method comprises, after the step of the master computer receiving the wakeup message, a step of the master computer sending a confirmation message for the wakeup of the communications network, via the communications network, to the at least one slave computer.

The management method preferably comprises a step of the first slave computer receiving the confirmation message.

Advantageously, the management system comprises at least one second slave computer that is connected to the first slave computer and to the master computer by the bidirectional wired link, the step of receiving the wakeup message is furthermore performed by the at least one second slave computer, and the wakeup step furthermore brings about the wakeup of the second slave computer.

In the same way, since the management system comprises at least one second slave computer that is connected to the first slave computer and to the master computer by the bidirectional wired link, the step of the master computer sending a wakeup confirmation message for the communications network, via the communications network, advantageously makes it possible for the wakeup confirmation message to be sent to the first slave computer and to the at least one second slave computer.

DESCRIPTION OF THE FIGURES

Other features and advantages of the system and method will become clear upon reading the following detailed description of embodiments of the system and method, given merely by way of example and with reference to the drawings, in which:

FIG. 5 is a block diagram of an embodiment of a management method comprising a wakeup phase in which a wakeup request is emitted by a master computer, and FIG. 6 is a block diagram of an embodiment of a management method comprising a wakeup phase in which a wakeup request is emitted by a slave computer.

DETAILED DESCRIPTION

In the following, the embodiments described relate more particularly to the installation of a system for managing a communications network within a motor vehicle. However, any installation in a different context, in particular in any type of vehicle, is also covered by the present invention.

As is known, a motor vehicle comprises a plurality of onboard computers, designated as slave computers 20, which, when active, make it possible to actuate a command of the vehicle. The actuation of a command is achieved for example by the emission of a message that is received by the equipment to which the command relates.

In order to achieve this, slave computers 20 are connected to a master computer 10, via a multiplex communications network W. The master computer 10 is thus configured to control each of the slave computers 20.

The communications network W is a network of the fiber-optic Ethernet type, has the advantage of being a local network having a very high data transfer rate, thus, making it possible to limit the disruption.

Figure 1:
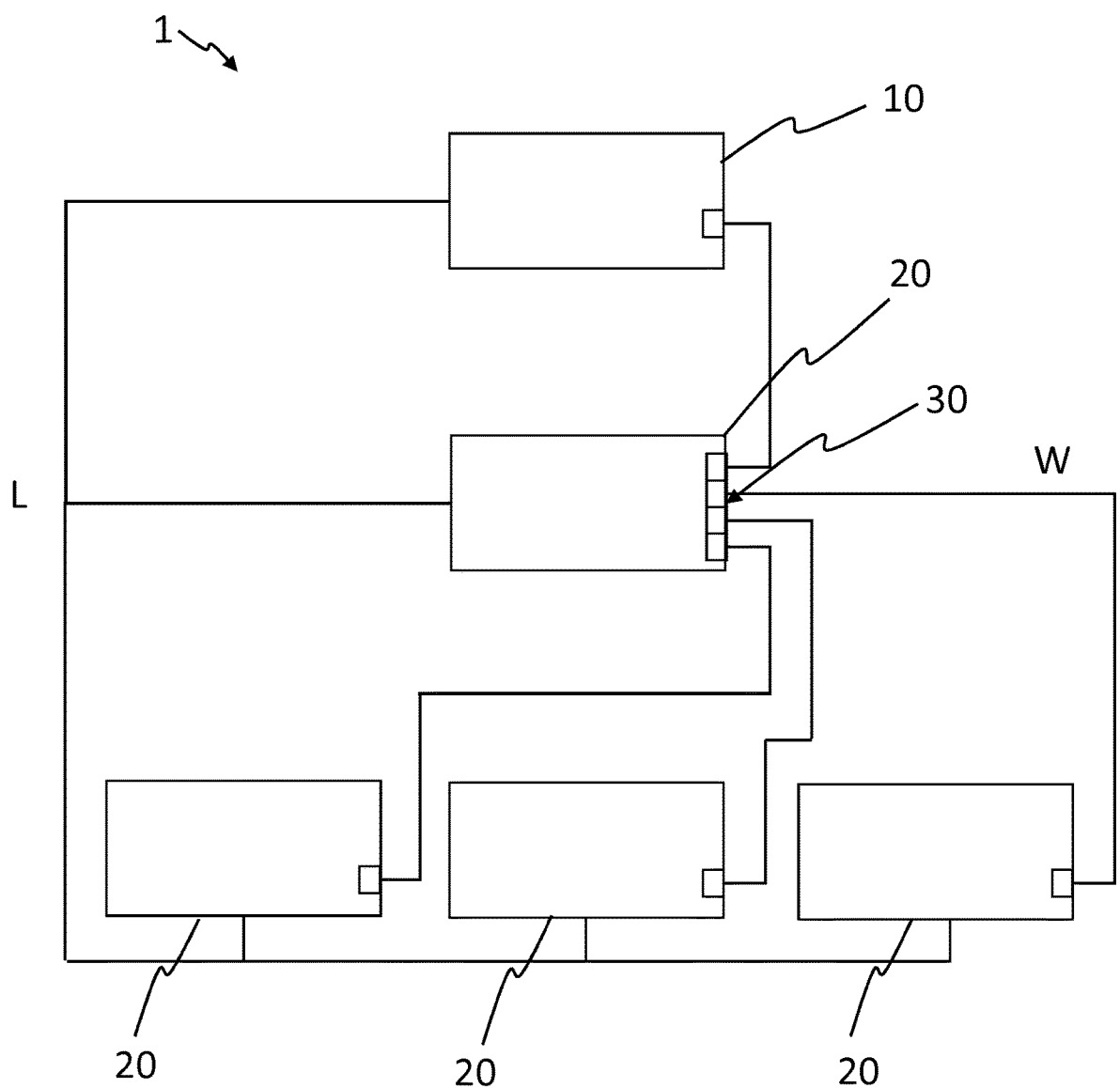
FIG. 1 is a schematic view of an embodiment of a management system.

With reference to FIG. 1, a motor vehicle (not shown) comprises a management system 1. The management system 1 comprises a master computer 10, a plurality of slave computers 20 and a multiplex fiber-optic Ethernet communications network W that interconnects the master and slave computers 10, 20. According to a preferred embodiment, the fiber-optic Ethernet communications network W further comprises an additional bidirectional wired link L that connects each master 10 and slave computer 20 of the network W.

The master computer 10 is configured to transmit a message via the fiber-optic Ethernet network W, making it possible to manage the state of the network W. In other words, the master computer 10 is configured to control each slave computer 20 in order to place the slave computers into a precise state. Such a system for managing the network W advantageously makes it possible to use the computers 10, 20 connected to the network W only if this is necessary.

In the illustrative embodiment of FIG. 1, the management system 1 comprises four slave computers 20, each dedicated to a specific function of the vehicle. However, it goes without saying that the management system 1 could comprise a different number of slave computers, in particular, the system 1 could include one single slave computer 20 or at least two slave computers 20.

In the remainder of this document, since the communications network W interconnects the computers 10, 20, the terms "wakeup of the communications network W/putting the communications network on standby" are intended to mean the wakeup or putting on standby of all the computers 10, 20 that are connected by the communications network W.

Each computer 10, 20 of the management system 1 is configured to send and receive messages relating to the state of the communications network W via the bidirectional wired link L. Messages of this kind correspond to state changes a0, a1 of a signal S1, S2, S3, S4, S5 that is generated by the bidirectional wired link L. The master computer 10 and the slave computers 20 are furthermore configured to send and receive, respectively, a confirmation message relating to the state of the communications network W via the communications network W.

In this embodiment, each computer 10, 20 is thus configured for commanding the wakeup of the network W, with the aim of placing the network into an "awake" state. In addition, each computer 10, 20 is configured for sending a wakeup message via the bidirectional wired link L. Moreover, the master computer 10 is configured for commanding that the network W should be put on standby, with the aim of placing the network in a "standby" state.

The master computer 10 is also configured, upon receiving a wakeup message issued by one of the slave computers, to wake up and send a wakeup confirmation message to all the slave computers 20 of the communications network W. Furthermore, upon receipt of such a wakeup message sent by one of the slave computers 20, each slave computer 20 is configured to wake up and await the confirmation message transmitted by the master computer 10.

Each slave computer 20 is thus connected to the master computer 10 in order for the master computer 10 to control the state of the slave computers 20. In addition, in order to connect each master 10 and slave computer 20 to the communications network W, one of the computers 10, 20 comprises a switch 30 (shown in FIG. 1). All the computers 10, 20 are connected to the switch 30 in order to be interconnected by the communications network W.

In the embodiment shown in FIG. 1, a first slave computer 20 comprises a switch 30 of this kind, but it is self-evident that, alternatively, the master computer 10 could comprise the switch 30.

The bidirectional wired link L, configured for connecting each computer 10, 20 to all the other computers 10, 20 of the management system 1, makes it possible for the master 10 and slave 20 computers to activate the wakeup (or setting into standby) of the communications network W.

Figure 2:
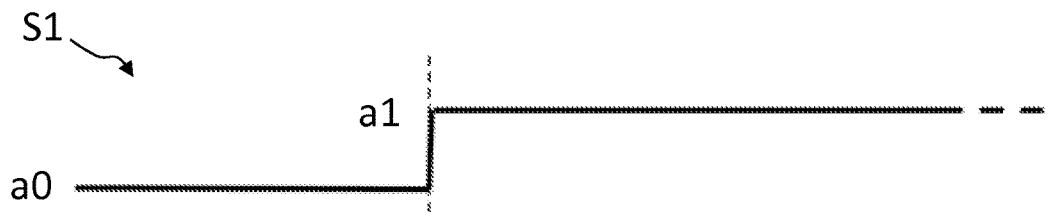
FIG. 2 is a schematic view of a wakeup signal emitted by a master computer of the management system of FIG. 1.
Figure 3:
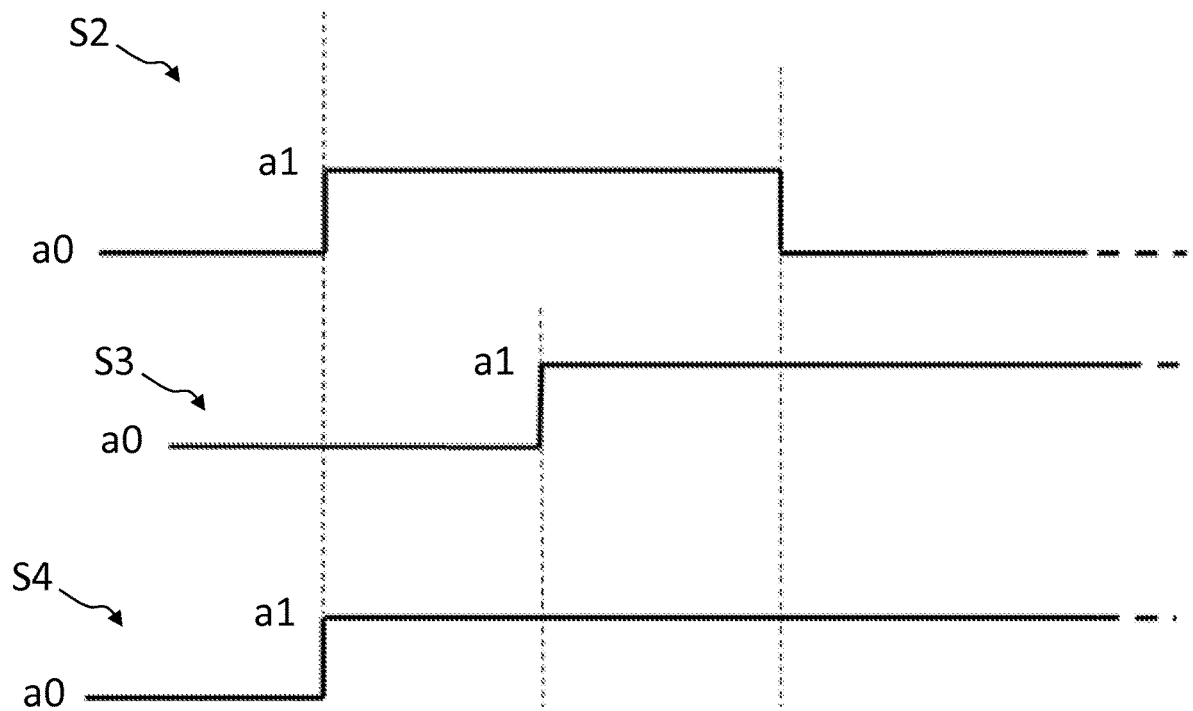
FIG. 3 is a schematic view of a wakeup signal emitted by a slave computer of the management system of FIG. 1.
Figure 4:
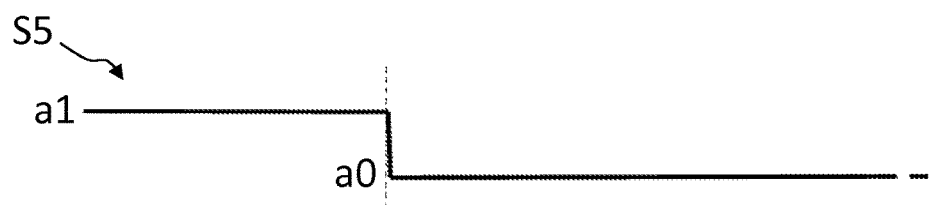
FIG. 4 is a schematic view of a signal for entering standby mode, emitted by a master computer of the system of FIG. 1.

In order to achieve this, with reference to FIGS. 2 to 4, each computer 10, 20 is configured to generate an electrical signal S1, S2, S3, S4, S5 on the bidirectional wired link L. The signals S1, S2, S3, S4, S5 comprise a high state a1, corresponding to the activation of the bidirectional wired link L, and a low state a0, corresponding to the deactivation of the bidirectional wired link W. Each state a0, a1 is thus associated with a state of the communications network W.

In this embodiment, the high state a1 of the bidirectional wired link L is associated with an awake state of the network W, and the low state a0 of the bidirectional wired link L is associated with the state of putting the network W on standby. It is self-evident that the association of the states a0, a1 could be reversed.

The signal S1, shown in FIG. 2, represents the activation of the bidirectional wired link L by the master computer 10 in the event of the wakeup for the communications network W being commanded by the master computer 10.

The signal S2, shown in FIG. 3, represents the activation of the bidirectional wired link L by a slave computer 20. The activation causes the master computer 10 to maintain the activation of the bidirectional wired link L represented by the signal S3, as long as the communications network W is awake. The signal S4 represents the resultant of the electrical signals S2 and S3 on the bidirectional wired link L.

The signal S5, shown in FIG. 4, represents the deactivation of the bidirectional wired link L by the master computer 10 in order to command setting of the communications network W into standby.

By virtue of the management system 1 according to the invention, the waking-up and putting into standby of the computers 10, 20, and thus of the communications network W, can be commanded via the bidirectional wired link L. Moreover, since the wired link L is bidirectional, each computer 10, 20 can command the wakeup of the other computers 10, 20 and thus of the communications network W, as will be described below. In the same way, the master computer 10 can also command putting the slave computers 20, and thus the communications network W, into standby, allowing, for example, energy saving for the systems of the vehicle.

In the following, a preferred embodiment of a method for managing the state of the fiber-optic Ethernet communications network W will be set out. With reference to FIGS. 2 to 6, the network W comprises a master computer 10 and a plurality of slave computers 20. In this example, the management method comprises a wakeup phase and a phase of setting in standby.

FIG. 2 shows, in the wakeup phase, the wakeup of the communications network W commanded by the master computer 10. As described above, FIG. 5 describes a method for managing the wakeup of the network W requested by the master computer 10. In this case, the master computer 10 is woken locally and is activated, in a step $E1_A$, and the bidirectional wired link L allows for the sending of a wakeup message in a step $E2_A$. With this aim, the signal S1 emitted by the master computer 10 on the bidirectional wired link L thus passes, in the step $E1_A$, from the low state a0 into the high state a1.

The slave computers 20 detect the change of state a0, a1 of the bidirectional wired link L. The slave computers 20 thus receive the wakeup message in a step $E3_A$, and wake up, in a step $E6_A$, bringing about the wakeup of the communications network W which remains awake.

Alternatively, in the wakeup phase, the wakeup of the network W can be requested by a first slave computer 20, as illustrated in FIG. 3, and the method of which is shown in FIG. 6. In this case, a first slave computer 20 of this kind is woken locally and active, in a step $E1_B$, the bidirectional wired link L allowing for the sending of a wakeup message in a step $E2_B$. With this aim, the signal S2 emitted by the first slave computer 20 on the bidirectional wired link L passes from the low state a0 into the high state a1.

The master computer 10 and the other slave computers 20 thus detect the change of state a0, a1 of the bidirectional wired link L. All the computers 10, 20 thus receive the wakeup message, in a step $E3_B$, and thus await a wakeup confirmation message.

The master computer 10 then sends, in a step $E4_B$, a wakeup confirmation message that is received by all the slave computers 20 in a step $E5_B$. The reception of a message of this kind causes the wakeup of all the computers 10, 20 of the network W in a step $E6_B$. In order to achieve this, the signal S3 passes from the low state a0 to the high state a1 in order to keep the communications network W awake. The state of the signal S3 is maintained as long as the network W is awake. Thus, the resultant of the signals S2 and S3 is the signal S4, the change of state of which is detected by all the computers 10, 20.

Advantageously, since the signal S4 transmitted on the bidirectional wired link L is kept in the high state a1 by the master computer 10, the computers 10, 20 are kept awake even in the event of the communications network W being lost.

The master computer 10 can furthermore command setting the communications network W into standby, as is shown in FIG. 4. In this case, the master computer 10, initially awake, sends a message for setting into standby, and thus generates the signal S5 on the bidirectional wired link L which passes from the high state a1 to the low state a0.

The slave computers 20 detect the change of state a0 of the signal S5 via the bidirectional wired link L, and receive the message for setting the communications network W into standby. The slave computers 20 are thus set into standby, which results in the communications network W being set into standby.

A management system 1 of this kind advantageously makes it possible to control, via a bidirectional wired link L, the fiber-optic Ethernet communications network W with which the vehicle is equipped, thus allowing for a network W of this kind to be put into standby mode when possible, allowing for energy saving, for example. A network W of this kind can also advantageously be woken either by the master computer 10 or by the slave computer 20, since the wired link L according to the invention, equipping the network, is advantageously bidirectional.

The invention claimed is:

1. A management system for managing a multiplex communications network of a vehicle, said communications network being a fiber-optic ethernet communications network; said management system comprising a plurality of computers that are connected to said communications network and a bidirectional wired link that interconnects said plurality of computers separately from said communications network, said communications network and said plurality of computers being switchable between a standby state and an awake state, said plurality of computers comprising a master computer and at least one slave computer, each of said master computer and said at least one slave computer being configured to emit and to receive a message relating to a requested state of the communications network via said bidirectional wired link, and wherein said master computer is configured to emit via the communications network a confirmation related to said requested state and said at least one slave computer is configured to receive the confirmation message, whereby the state of at least one of the plurality of computers is controlled on the basis of said message relating to the requested state so as to control the state of the communications network.

2. The management system according to claim 1, wherein said message relating to said state of the communications network corresponds to a change in state of a signal emitted by the master computer and/or by said at least one slave computer via the bidirectional wired link.

3. The management system according to claim 2, wherein said emitted signal has a high state and a low state, one of said high state and said low state of the signal corresponding to the awake state of the communications network, and the other of said high state and said low state of the signal corresponding to the standby state of the communications network.

4. The management system according to claim 1, wherein said at least one slave computer comprises a first slave computer and at least one second slave computer, said at least one second slave computer being connected to the master computer and to said first slave computer by means of said bidirectional wired link, at least one of the master computer and the first slave computer comprising a switch that is designed to connect said at least one second slave computer to the communications network.

5. A motor vehicle comprising a fiber-optic Ethernet communications network and the management system of claim 1.

6. A method for managing a multiplex communications network of a vehicle, said vehicle comprising a management system for managing said communications network, said communications network having a standby state and an awake state, said management system comprising a master computer and at least one first slave computer connected to said communications network, said communications network being of the fiber-optic Ethernet type, said management system further comprising a bidirectional wired link which interconnects said master computer and at least one first slave computer separately from said communications network, said method comprising a phase of waking up said communications network, said phase comprising:
   a step of activating said bidirectional wired link,
   a step of said master computer or said at least one first slave computer sending a wakeup message for the communications network via the bidirectional wired link,
   a step of the other of said master computer or said at least one first slave computer receiving said wakeup message, and
   a step of waking up said master computer and said at least one first slave computer, resulting in the wakeup of the communications network.

7. The management method according to claim 6, wherein said step of sending a wakeup message for the communications network is performed by the at least one first slave computer, the method comprising, after the step of the master computer receiving said wakeup message, a step of the master computer sending a confirmation message for the wakeup of the communications network, via the communications network to said at least one first slave computer.

8. The management method according to the claim 7, comprising a step of the at least one first slave computer receiving said confirmation message.

9. The management system according to claim 6, wherein said management system comprises at least one second slave computer, said at least one second slave computer being that is connected to said at least one first slave computer and to said master computer by the bidirectional wired link, the step of receiving said wakeup message being performed by said at least one second slave computer, and the wakeup step awakens the at least one second slave computer.

* * * * *